Apr. 3, 1923.

H. E. ALLEN

LEER CONVEYER FOR SHEET GLASS

Filed Oct. 10, 1921

1,450,571

INVENTOR
Horace E. Allen
BY C. A. Rowley
ATTORNEY

Patented Apr. 3, 1923.

1,450,571

UNITED STATES PATENT OFFICE.

HORACE E. ALLEN, OF TOLEDO, OHIO, ASSIGNOR TO THE LIBBEY-OWENS SHEET GLASS COMPANY, OF TOLEDO, OHIO, A CORPORATION OF OHIO.

LEER CONVEYER FOR SHEET GLASS.

Application filed October 10, 1921. Serial No. 506,663.

*To all whom it may concern:*

Be it known that I, HORACE E. ALLEN, a citizen of the United States, residing at Toledo, in the county of Lucas and State of Ohio, have invented new and useful Improvements in Leer Conveyers for Sheet Glass, of which the following is a specification.

This invention relates to the art of making sheet glass, and especially to an improved form of leer-conveyer for transporting a continuous sheet of glass through a leer with a minimum amount of injury to the glass sheet.

In certain systems of drawing sheet glass, for example, the Colburn process as shown in the patent to I. W. Colburn, 1,248,809, granted Dec. 4, 1917, a continuous sheet of glass is drawn from a molten source, and, after being flattened, is passed horizontally through a rather long leer, or annealing chamber, in which the temperature gradually decreases from the end where the sheet enters to the end where the sheet passes out to the cutting tables. Different forms of conveyers may be used to advance this continuous sheet through the leer, the usual type comprising a series of spaced driven rollers which carry the sheet. The fine fire-polished surface of the sheet is easily scratched and any sliding movement against foreign surfaces, such as that of the rollers, is to be avoided if possible. These rollers are all driven at the same speed from a common source. Now, unless the peripheral speed of these rollers is exactly equal to the speed at which the sheet is fed to the leer by the sheet-drawing mechanism, there will be some relative movement between the sheet and the contacting surfaces of the rollers. Also, due to the contraction of the sheet as it cools, the speed of travel of the sheet is not constant throughout the length of the leer, and if the rollers are all driven at the same speed, some of them must have more or less sliding contact with the sheet.

The object of the present invention is to avoid as far as possible this relative movement between the surfaces of the sheet and the supporting rollers, and hence avoid the scratching of the sheet surface due to this sliding contact. In this improved conveyer, the series of spaced supporting rollers are all idlers, and are mounted on anti-friction bearings, so that they roll freely and their peripheral speed will conform to the speed of the sheet supported thereon. The various speeds of the rollers throughout the leer may vary in accordance with the speed of the sheet at the different points. The sheet is advanced through the leer by a second series of driven rolls, arranged at intervals throughout the leer, which engage only a narrow edge portion of the sheet at each side thereof. Since this edge portion has already been marred by the sheet-drawing process, and must eventually be discarded, any slipping or scratching between these edge driving rolls and the sheet is immaterial, and it is not essential that the speed of the rolls be adjusted with the nicety necessary with conveyers now in use.

Other objects and advantages of the invention will be apparent from the following detailed description. In the accompanying drawings.

Figure 1:
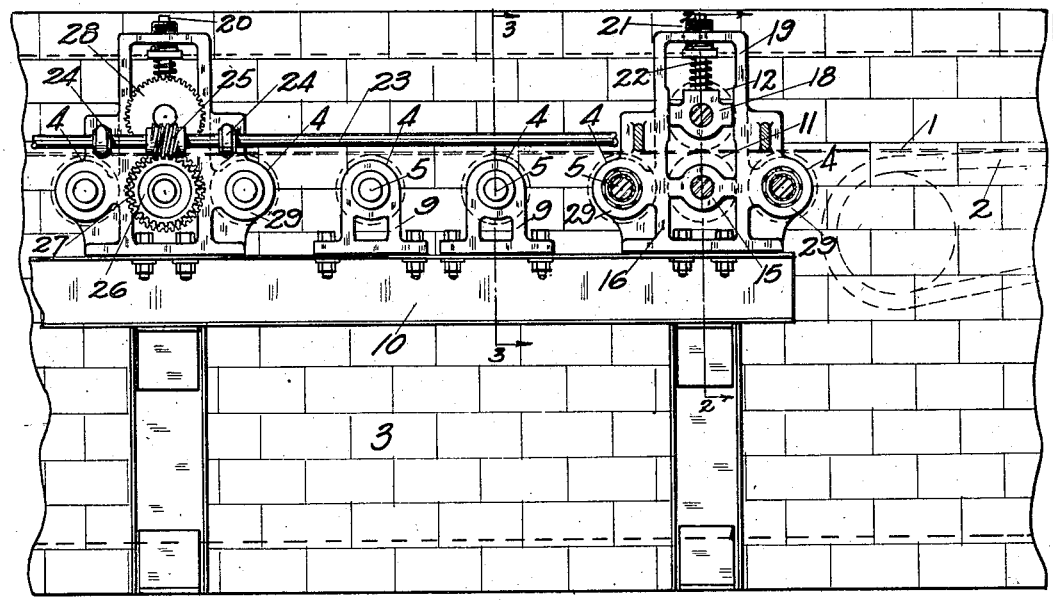
Fig. 1 is a side elevation of a portion of the leer, the driving gearing for the right-hand set of driving rolls being broken away, substantially on the line 1—1 of Fig. 2.
Figure 2:
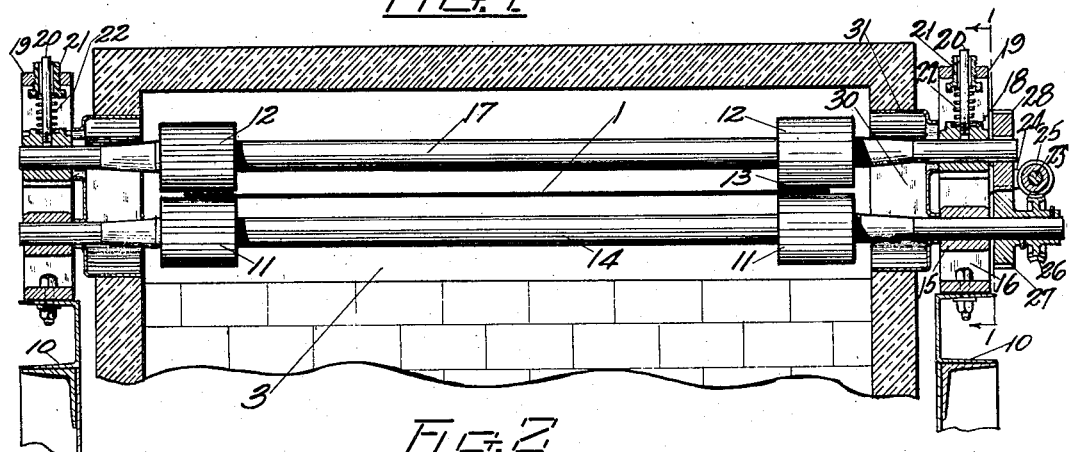
Fig. 2 is a vertical transverse section, taken substantially on the line 2—2 of Fig. 1, the driving rolls and their shafts being shown in elevation.

The continuous sheet of glass 1 is drawn from its molten source by a sheet-drawing mechanism, (one end of which is indicated in dotted lines at 2 in Fig. 1), and from this sheet-drawing mechanism the sheet passes into the leer 3. This leer or annealing oven 3 is a substantially closed chamber whose internal heat is regulated from a fairly high temperature, (about that of the drawn sheet), at the end where the sheet enters, to a lower temperature, (approximately that of the outer air), at the exit end of the leer. These temperatures are regulated by burners suitably positioned and adjusted in the leer.

The sheet passes from the drawing mechanism 2 onto a series of parallel, horizontal, idler supporting rollers 4, which are spaced at short intervals throughout the length of the leer. These rollers may be made of, or covered with, asbestos or refractory material such as clay, or may be made of metal or of wood in those portions of the leer where the heat is not so intense. It is desirable to employ a material which will be least apt to scratch or shrend the glass. Each roller 4 is carried by a horizontal shaft 5 which projects through apertures 6 in the sides of the leer. The apertures are preferably closed by collars or casings 7 surrounding the shaft ends, to retain the heat within the leer. The shafts 5 turn in anti-friction bearings, either ball or roller, a well-known type of spiral roller bearings 8 being illustrated by way of example. These bearings are carried in brackets 9 mounted on beams 10 at the sides of the leer. Since these rollers 4 turn freely in their bearings they will conform to the speed of the sheet 1 resting thereon, and will have only a rolling contact therewith, hence the tendency to scratch or mar the sheet will be reduced to a minimum.

To advance the sheet continuously through the leer, pairs of driving rolls 11 and 12 engage the sheet at each edge, at intervals throughout the length of the leer. As shown in Fig. 1, four idler rollers 4 are located between each successive set of driving rolls, but this spacing is merely illustrative. Since very little power is needed to advance the sheet over the freely turning supporting rollers, the driving rolls might be spaced at much greater intervals. In the process of drawing the sheet 1 from its molten source, the edge portions of the sheet are drawn somewhat thicker than the main body of the sheet, and are marred or roughened by the width maintaining means which engages the edges near their source. This thickened edge is indicated at 13, and this edge portion is eventually cut away from the finished sheet and remelted as cullet. The pairs of driving rolls 11 and 12 engage only this rough edge 13 of the sheet. The rolls 11 and 12 are preferably faced with asbestos, although any suitable heat resisting material may be here used.

The lower driving rolls 11 at the two edges of the sheet are keyed to a drive shaft 14, journaled in bearings 15, preferably integral with bearing brackets 16 mounted on the beams 10. The upper driving rolls 12 are keyed to a second shaft 17, carried at its ends in bearings 18, slidable vertically in yoke extensions 19 of the brackets 16.

Means are provided to yieldingly hold the rolls 12 down upon the upper edge portions of the sheet, but at the same time permit these rolls to move up when necessary to allow any unusual thickness of the sheet to pass thereunder. A guide pin 20 secured in the top of each bearing 18, projects up through an adjusting sleeve-member 21, screwed into the cross-member of the yoke 19. A compression spring 22 surrounds the guide pin 20, between sleeve 21 and bearing 18, and the compression of the spring is regulated by suitably adjusting the screw-sleeve 21 in the yoke 19. These springs 22 serve to hold the rollers 12 down in driving engagement with the upper edge portions of the sheet. Only light springs need be used, and these springs may often be omitted, as the weight of the rolls 12 and shaft 17 will usually be ample to give the necessary driving engagement with the sheet. The several lower shafts 14 are driven from a common drive shaft 23, extending along one side of the leer, and mounted in bearings 24, which may also be carried by the bearing frames 16. Universal joints may be placed at intervals in this shaft 23 to avoid binding in the bearings 24. Worms 25 on drive shaft 23, engage with worm-wheels 26 on the driven ends of shafts 14. A spur gear 27 on shaft 14, meshes with a similar spur gear 28 on shaft 17, so that rolls 12 will be driven at the same speed as rolls 11 but in the opposite direction. The rolls 11 and 12 will not ordinarily be separated to an extent sufficient to carry the gears 27 and 28 out of mesh, but if this should take place no harm will be done as the gears will readily drop back into mesh. Drive shaft 23 may be geared to the drawing mechanism 2, and driven thereby, or may be driven from a separate source such as an electric motor. It is only essential that the peripheral speeds of the drive rolls 11 and 12 be substantially the same as the speed at which the sheet is fed into the leer from the sheet-drawing mechanism. If there is some slight variation between the speeds of some of all of the rolls 11 and 12 and the speed of the sheet 1, the scratching that may occur on the sheet will be confined to the edge portions 13 of the sheet, and hence is of no consequence.

The two supporting rollers immediately adjacent the driving rolls 11 and 12, at either side thereof, may be conveniently mounted in bearing 29, formed as a part of, or secured to, the bearing frames 16. This will ensure these rollers 4 being in proper horizontal alignment with the intervening rolls 11, thus avoiding any possible springing or cracking of the glass sheet at the points where the driving pressure occurs thereon.

The openings 30 in the leer sides through which the shafts 14 and 16 and the adjacent pairs of shafts 5 project are closed by casings or covers 31 which closely surround the shafts to retain the heat within the leer.

Figures 3, 4:
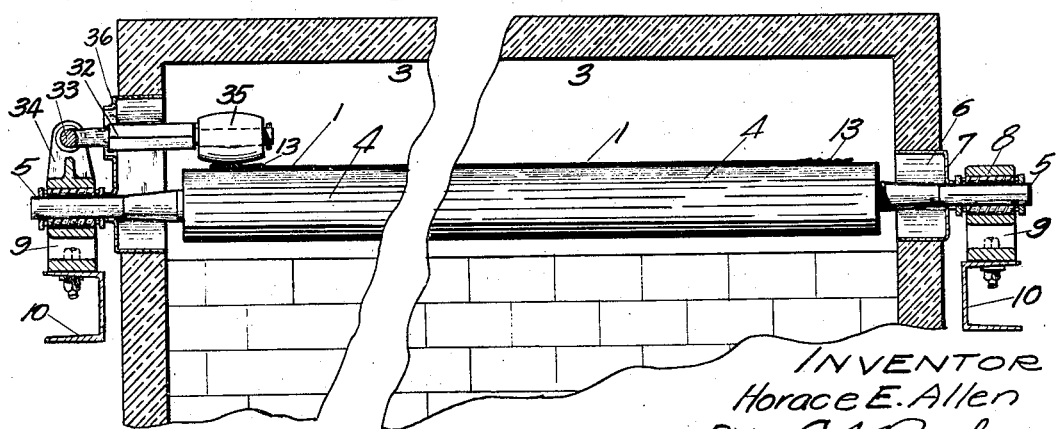
Fig. 3 is a transverse vertical section, taken substantially on the line 3—3 of Fig. 1, the idler supporting roll and its shaft being shown in elevation.
Fig. 4 is a view similar to Fig. 3, of the opposite end of one of the supporting rolls, illustrating a modification.

In Fig. 4 is shown a slight modification, or addition to, the idler roller construction as illustrated in Fig. 3, and already described. A non-rotary shaft or rod 32 is pivoted at one end, as at 33, in a yoke 34 extending up from bearing-bracket 9. The opposite end of shaft 32 extends into the leer above the idler roller 4, and carries a freely rotating roller 35 which rests upon the roughened edge portion 13 of the glass sheet 1. It will be noted that this roller 35 rests with practically its entire weight upon the edge portion 13 of the glass sheet, and rolls idly thereon. It may sometimes occur that due to some slight warping, the glass sheet would tend to ride up away from the supporting roller 4, and not rest with sufficient weight thereon to rotate this idler roller. The idler edge rollers 35 (which it is to be understood might be used above each end of each roller 4), would add sufficient weight to that of the sheet itself to maintain a good rolling contact between the glass sheet and the roller 4, and thus prevent any slippage therebetween, which might scratch the glass sheet. As in the previously decribed constructions, the opening in the leer wall through which the shafts 5 and 32 project is closed, as far as possible by the closure or casing 36.

It will be observed that in this apparatus the main portion of the sheet 1 is passed through the leer without contacting at any point with any driving means. The upper surface of the sheet does not contact with anything, and the lower surface only rides over the idler rollers 4, on which it has a free rolling contact. In this way the possibility of scratching or marring the fine fire-polished surface of the drawn sheet is reduced to a minimum.

Claims:

1. In a leer for continuous sheet glass, a series of idler rollers for supporting the glass sheet, and a series of means engaging the sheet between certain of the idler rollers at spaced intervals throughout the leer for advancing the sheet over the idler rollers.

2. In a leer for continuous sheet glass, a series of idler rollers for supporting the glass sheet and means engaging the edges of the sheet only for advancing the sheet through the leer.

3. In a leer for continuous sheet glass, a series of idler rollers for supporting the glass sheet, and driving rolls engaging the edges only of the glass sheet for advancing the sheet through the leer.

4. In a leer for continuous sheet glass, a series of idler rollers for supporting the glass sheet, and pairs of driving rolls gripping the edges only of the sheet for advancing the sheet through the leer.

5. In a leer for continuous sheet glass, a series of idler rollers for supporting the glass sheet, and pairs of driving rolls arranged at intervals throughout the leer, and gripping the opposite edges only of the glass sheet to advance the sheet through the leer.

6. In a leer for continuous sheet glass, a series of idler rollers for supporting the glass sheet, pairs of driving rolls arranged at intervals throughout the leer, and gripping the opposite edges only of the glass sheet to advance the sheet through the leer, and a common driving means for the several pairs of driving rolls.

7. In a leer for continuous sheet glass, a series of idler rollers for supporting the glass sheet, a series of drive shafts arranged at intervals throughout the leer, a pair of driving rolls keyed to each shaft, one of the rolls being beneath each edge of the sheet, and a pair of rolls yieldingly held against the upper edge portions of the sheet, one above each lower driving roll.

8. In a leer for continuous sheet glass, a series of idler rollers for supporting the glass sheet, a series of drive shafts arranged at intervals throughout the leer, a pair of driving rolls keyed to each shaft, one of the rolls being beneath each edge of the sheet, a pair of rolls yieldingly held against the upper edge portions of the sheet, one above each lower driving roll, and means for driving the upper edge rolls from the drive shaft.

9. In a leer for continuous sheet glass, a series of idler rollers for supporting the glass sheet, a series of drive shafts arranged at intervals throughout the leer, a pair of driving rolls keyed to each shaft, one of the rolls being beneath each edge of the sheet, a pair of rolls yieldingly held against the upper edge portions of the sheet, one above each lower driving roll, means for driving the upper edge rolls from the drive shaft, and a common driving means for the several shafts.

10. In a leer for continuous sheet glass, a series of idler rollers for supporting the glass sheet, a series of drive shafts arranged in pairs, one above and one below the sheet, pairs of driving rolls carried by the shafts and engaging the opposite faces of the edge portions of the sheet, means for driving each upper shaft from the corresponding lower shaft, and a common driving means for the several lower shafts.

11. In a leer for continuous sheet glass, a series of idler rollers for supporting the glass sheet, a series of idler edge rollers, resting freely on the upper edge portions of the glass sheet to hold the sheet in rolling contact with the supporting rollers, and driving means engaging the edges of the sheet only for advancing the sheet through the leer.

12. In a leer for continuous sheet glass, a series of idler rollers for supporting the glass sheet, a series of idler edge rollers, resting freely on the upper edge portions of the glass sheet to hold the sheet in rolling contact with the supporting rollers, and pairs of driving rolls engaging the edges only of the sheet for advancing the sheet through the leer.

Signed at Toledo, in the county of Lucas and State of Ohio, this 8th day of October, 1921.

HORACE E. ALLEN.